United States Patent [19]
Perlot

[11] Patent Number: 6,098,996
[45] Date of Patent: Aug. 8, 2000

[54] CARRIER LEVELING AND STABILIZING SYSTEM

[75] Inventor: Mathew Murray Perlot, Bend, Oreg.

[73] Assignee: SMC Corporation, Harrisburg, Oreg.

[21] Appl. No.: 09/156,326

[22] Filed: Sep. 18, 1998

[51] Int. Cl.[7] .................................................. B60S 9/00
[52] U.S. Cl. .................................. 280/6.153; 254/93 VA
[58] Field of Search ............................ 280/6.153, 6.154, 280/6.15; 298/11, 17 R, 17.5, 175; 254/93 VA

[56] References Cited

U.S. PATENT DOCUMENTS

| | | | |
|---|---|---|---|
| 3,917,307 | 11/1975 | Shoebridge | 280/6.153 |
| 3,933,359 | 1/1976 | Wallace | 280/6.153 |
| 4,375,903 | 3/1983 | Lovell | 298/17 S |
| 4,573,742 | 3/1986 | Tegtmeier | 298/11 |
| 4,923,210 | 5/1990 | Heider et al. | |
| 5,971,493 | 10/1999 | Robert | 280/17 S |

*Primary Examiner*—Paul N. Dickson
*Assistant Examiner*—Bryan Fischmann
*Attorney, Agent, or Firm*—Robert L. Harrington

[57] ABSTRACT

A leveling and stabilizing system for a carrier having a wheel and axle support supporting a suspension system which in turn supports the carrier body, such as a motor home. Stabilizing units are mounted to be extendable to directly support the carrier body on the wheel and axle support. The stabilizing units are utilized to level the carrier when at a location. The stabilizing units provide a rigid support between the carrier body and the wheel and axle support. The stabilizing units in the preferred embodiment are cylinders mounted to the carrier body and the cylinders have rods or plungers that are extendable to engage pads on the wheel and axle support and are retractable to dis-engage the pads.

8 Claims, 2 Drawing Sheets

CARRIER LEVELING AND STABILIZING SYSTEM

FIELD OF THE INVENTION

This invention relates to a wheel supported carrier body such as a motor home body wherein a suspension system permits relative movement between the wheels and the body, and more particularly it relates to an engageable, disengageable stabilizing system operable with the motor home parked to remove the effect of the suspension system and produce stabilization and leveling of the carrier body.

BACKGROUND OF THE INVENTION

This invention is primarily directed to recreational vehicles and more particularly to motor homes or coaches. The invention will be described as it applies to motor home use but the reader will appreciate that it has application to similar types of circumstances where stabilization and/or leveling of a carrier body is desired.

In a motor home there are conflicting needs or desires. While the motor home is being driven, comfortability (as well as structure preservation) requires that the body be suspended from the vehicle axle in a manner whereby irregularities of the roadway as encountered by the motor home wheels and axles are not directly transmitted to the body but instead are absorbed in part by the suspension system, e.g., in the form of springs or cushions. The hard bumps of the wheels are thus transmitted as a soft bounce or rocking of the body.

However, when the motor home is parked, that same suspension system provides instability and as occupants move about in the body of the motor home, there is felt a rocking of the motor home which is undesirable. Also, whereas the motor home operator will seek to find a level spot on which to park the motor home, such is often not available and even in RV parks, the pads are sometimes slightly off level and it is desirable to level the motor home body.

A crude form of leveling is to simply drive the motor home up onto wooden blocks of different thicknesses. This provides the leveling function but not stabilization as the body is still supported on the suspension system. Such has been largely replaced with leveling jacks. A leveling jack is typically mounted to the body and positioned behind each of the wheel sets (two in front and two in back although three jacks, one centered in front between the front wheels and two behind the rear wheels are not uncommon) and typically a hydraulic system (but not necessarily hydraulic) is actuated to selectively lower the jack plungers (cylinder rods) to the ground and thereby in large part provide direct support from the body to the ground. Various degrees of sophistication in the controls for the jacks enable the motor home operator to vary the plunger extensions of the various jacks for leveling the body and in the process, because the body is now supported directly on the ground, the body is also largely stabilized.

Several factors will be apparent from this arrangement. Should the operator attempt to drive the motor home without first raising the jacks, the jacks will be damaged. If a jack malfunctions and will not raise into the travel position, the motor home cannot be moved. If the support pad on which the motor home rests is soft ground, the jack plungers will simply sink into the ground and support blocks placed under the jacks are required. As weight is shifted from the wheels to the jacks, the jack plungers can slip which can damage the jacks and/or create a safety concern.

Another known leveling system uses air bags for the suspension system and with the motor home parked, selective ones of the air bags are partially deflated to produce leveling but not stabilization as the springiness of the suspension system has not been avoided.

BRIEF DESCRIPTION OF THE INVENTION

The present invention provides leveling jacks that extend from the body to the wheel and axle support. Because the suspension system by its nature permits relative vertical movement of the body from the wheel axle, the jack plungers (cylinder pads) are extended to a mated pad on the wheel and axle support and the body is selectively lifted away from the wheel axles. Such lifting allows for leveling and also removes the bounce effect of the suspension system. The wheels continue to support the body, but now directly rather than through the suspension system. The much greater footprint of the tires rather than jack plungers providing the total support of the motor home avoids a number of potential problems. There is no digging in problem as may be encountered with the use of ground supported jacks. There is no chance for slippage and limited driving of the vehicle with the body directly supported on the wheels is permitted. With ground supported jacks, when an operator wanted to move the motor home a few feet, e.g., to allow for awning deployment or slide out extension, e.g., which may have been overlooked or miscalculated, the operator had to raise the jacks and start all over.

The invention will be more fully appreciated upon reference to the following detailed disclosure of a preferred embodiment and the drawings referred to therein.

DESCRIPTION OF THE PREFERRED EMBODIMENT

Figure 1:
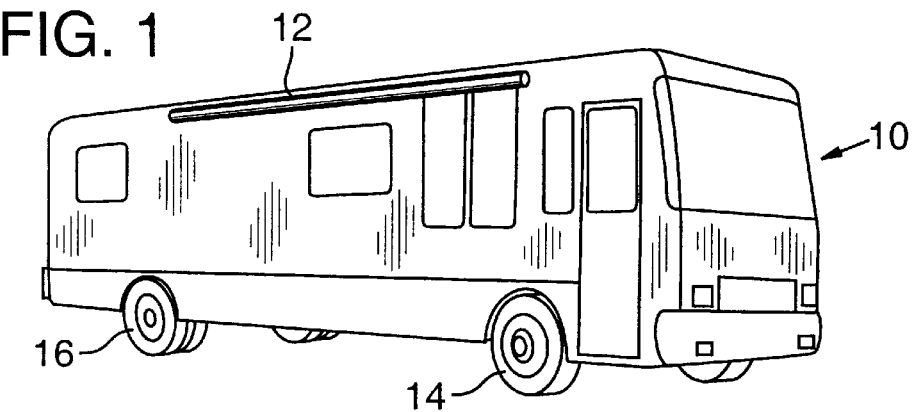
FIG. 1 is a view of a recreational vehicle.

FIG. 1 illustrates a vehicular carrier 10 and in this embodiment the carrier 10 is a recreational vehicle referred to as a motor home. The carrier 10 has a body 12 that is supported on a front wheel and axle support 14 and a rear wheel and axle support 16 (only the wheels of which are shown in this figure). A suspension system is interposed between the wheel and axle support 14 and the body 12 and between the wheel and axle support 16 and the body 12 as will be explained with reference to FIGS. 2 and 3.

Figure 2:
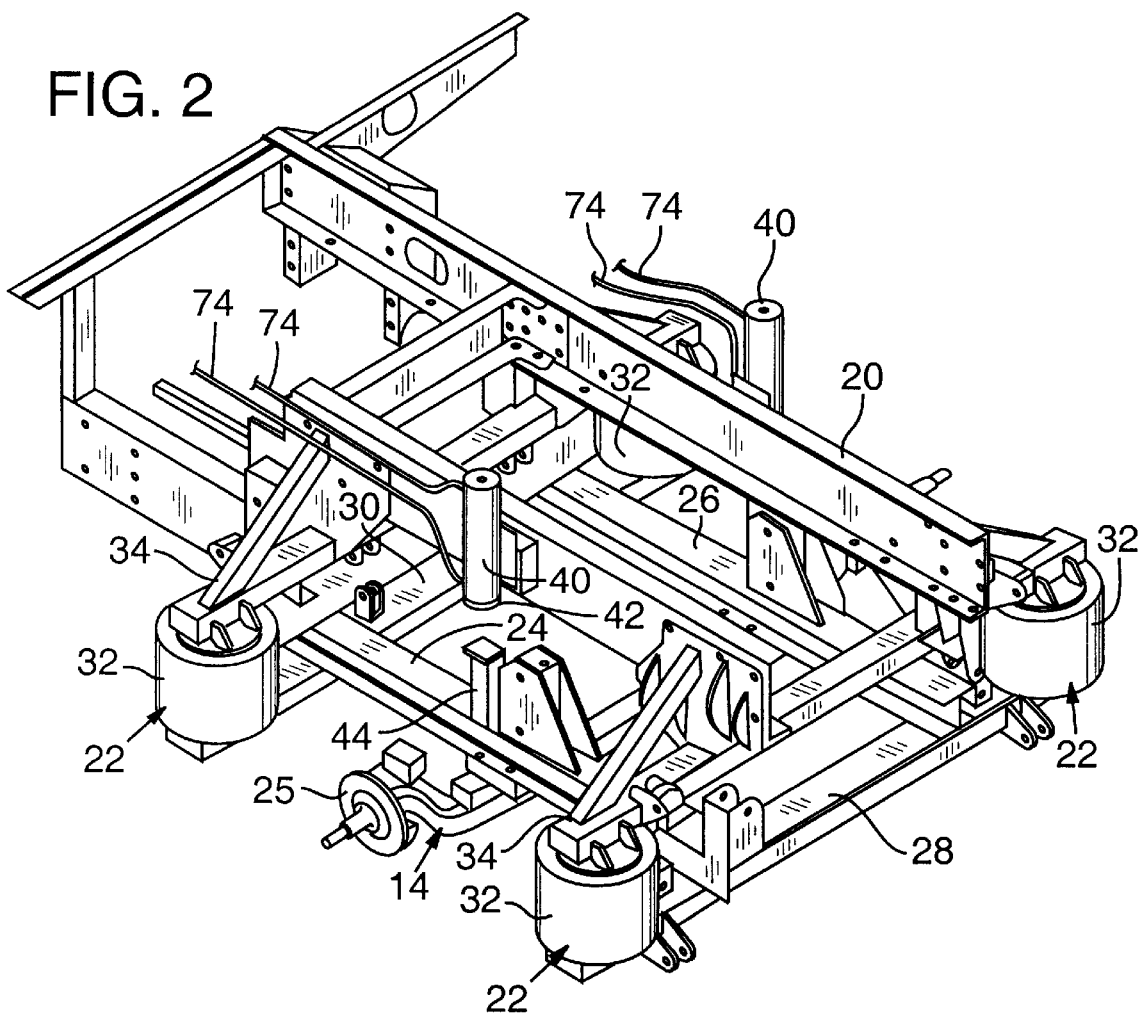
FIG. 2 is a perspective view of the various front end components providing support for the recreational vehicle of FIG. 1.
Figure 3:
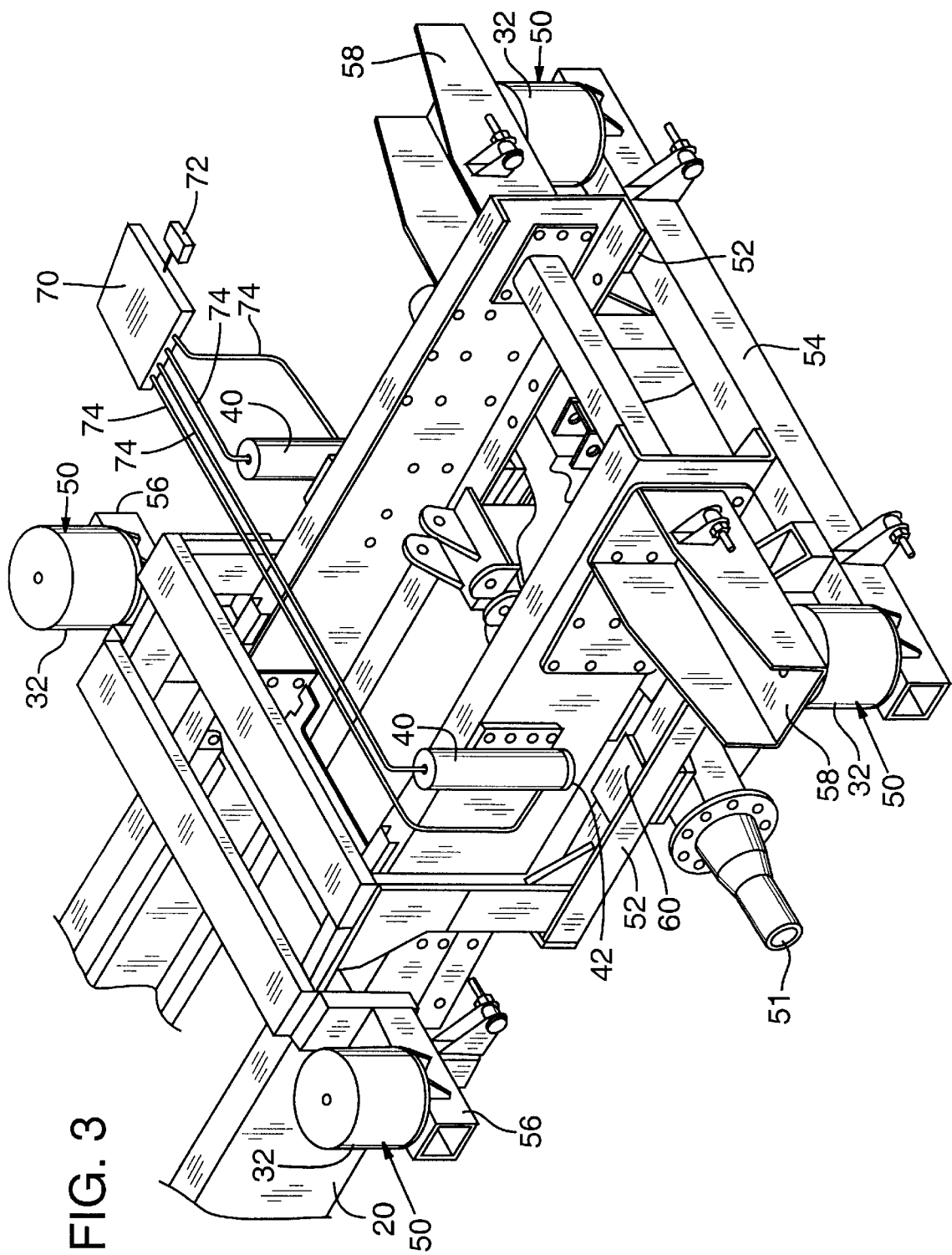
FIG. 3 is a perspective view of the various rear end components providing support for the recreational vehicle of FIG. 1.

The front and rear suspension systems per se are of known design and an example of such systems is illustrated in the commonly owned U.S. Pat. No. 5,566,971. Therefore only a portion of the suspension systems necessary for an understanding of the invention are illustrated in FIGS. 2 and 3. It will be apparent to those skilled in the art that the present invention may be applied to suspension systems having different configurations than that illustrated.

The reader should also understand that a suspension system may be described as spring or cushion members extended between brackets or the like which in turn are connected to the wheel assembly and body or body frame. The invention here involves the bypass of the spring or cushion members for stabilization. Thus, members and brackets used to support the spring or cushion members and which are affixed to the wheel assembly are considered to be a component of the wheel and axle support for purposes of defining the invention. Similarly such members and brackets which are affixed to the body including the body frame (main frame) are referred to as components of the body or main frame for purposes of defining the invention.

Refer now to FIG. 2 of the drawings which illustrates a portion of the main frame assembly 20 for the body 12. Also illustrated is the front suspension system 22 that is interposed between the wheel and axle support 14 and the main frame 20. Basically the suspension system 22 includes air bags 32. Beams 24 and 26 are secured to the front wheel axle 25 and cross members 28, 30 are fixedly attached to the beams 24, 26 with the extended ends of the cross members 28, 30 supporting the air bags 32. Brackets 34 are extended from the main frame 20 of the body 12 and are positioned strategic to the ends of the cross members 28, 30 to receive the opposite ends of the air bags 32. The air bags 32 provide a yieldable biasing member that permits the wheel and axle support 14 to move upwardly and downwardly relative to the main frame 20 of the carrier 10. The air bags 32 provide a shock absorbing feature for the carrier 10 such that when a wheel of the wheel and axle support 14 encounters a raised object or a lowered object in a roadway, the air bags 32 will either compress or expand to thus absorb and prevent serious shock to the body 12 of the carrier 10. This is typical of a suspension system for a vehicle in that when a wheel encounters an object in the roadway, the wheel and axle support may move relative to the main frame 20 so that the shock of the object encountered in the roadway is not transmitted directly to the main frame 20.

As previously mentioned, the wheel and axle support 14 are yieldably movable toward and away from the main frame 20 of the carrier 10. When the carrier 10 is parked or positioned in a desired location, it is desirable to level the body 12 of the carrier 10 as well as to remove the shock absorbing affect of the suspension system 22. In this embodiment stabilizing units 40 are mounted to the main frame 20 of the carrier 10. Each stabilizing unit 40 has a member 42 that is extendable and retractable from the stabilizing unit 40. The member 42 is extendable to engage a pad 44 mounted on each beam 24, 26. When the member 42 is extended from the stabilizing unit 40 to engage the pad 44, the main frame 20 of the carrier 10 becomes rigidly coupled to the wheel and axle support 14. The rigid coupling of the main frame 20 to wheel and axle support 14 prevents any rocking of the body 12 relative to the wheel and axle support 14. The stabilizing units 40 are further independently adjustable such that the member 42 may be extended from one stabilizing unit 40 a greater distance than the other member is extended from its stabilizing unit 40. This is beneficial when it is desired to level the main frame 20 relative to a supporting surface under the carrier wheels.

FIG. 3 illustrates a portion of the main frame 20 and a suspension system 50 interposed between the wheel and axle support 16 and the main frame 20. Axle 51 carries the rear wheels (not shown) and beams 52 are supported on the axle 51 and form a part of the wheel and axle support 16 which further includes a cross member 54 that extends between and beyond the beams 52 to support additional air bags 32 of the suspension system 50. Brackets 56 of the wheel and axle support 16 are arranged to receive additional air bags 32. Brackets 58 are extended from the main frame 20 of the body 12 and are positioned strategic to the beam 54 for overhead support of the air bags 32. The structure mounted to the main frame 20 that is positioned strategic to the brackets 56 is not shown for drawing clarity. However, the air bags 32 mounted to the brackets 56 are interposed between the structure extending from the main frame 20. The wheel and axle support 16 is thus movable upwardly and downwardly relative to the main frame 20 and the air bags 32 provide a cushioning or shock absorbing effect for the main frame 20. Stabilizing units 40 are mounted to the main frame 20 and are positioned strategic to each beam 52. The stabilizing units 40 have a member 42 that is extendable and retractable out of the stabilizing units 40. A contact pad 60 is mounted on each beam 52 and is positioned strategic to the stabilizing unit 40.

The stabilizing units 40 are used in the same manner as the stabilizing units of FIG. 2. When the carrier 10 is in a desired location for parking the carrier 10, each stabilizing unit 40 is independently operable such that the member 42 is extended out of each stabilizing unit 40 a required distance to contact the pad 60 on the wheel and axle support 16. The independent operation of the stabilizing units 40 provides the capability of leveling the main frame and thus the carrier 10 relative to a supporting surface such as the ground. Should the ground on which the carrier 10 is parked have an inclination, the stabilizing units 40 on the front and rear of the main frame 20 on both the front and rear suspension systems would be extended to contact their corresponding contact pads. The members 42 are extended out of the stabilizing units 40 to contact the pads and, if required, one side of the other of the stabilizing units 40 would be extended a greater distance to level the frame 20 and thus the carrier 10.

Besides leveling the main frame 20 and thus the carrier 10 on a side-to-side basis, the stabilizing units 40 coupled to the front wheel and axle support may be extended a different distance than the stabilizing units 40 coupled to the rear wheel and axle support. The carrier 10 thus may be leveled not only from a side-to-side basis but also on a fore-to-aft basis.

In this embodiment the stabilizers 40 are hydraulic cylinders and the member 42 is a cylinder rod that is extendable and retractable out of the cylinders 40. The end of the cylinder rods when extended will contact the pads 44 on the front wheel and axle support and the pads 60 on the rear wheel and axle support. A power source 70 and control 72 are provided to control the operation of the stabilizing units 40. Hydraulic lines 74 are coupled to each of the stabilizing units 40 in a conventional manner. The control 72 is arranged to control the operation of the stabilizing units 40 simultaneously or independently.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A recreational vehicle comprising:
   a carrier body, a wheel and axle support for the carrier body and a suspension system interposed between the wheel and axle support and the carrier body providing cushioned support for shock absorption of road irregularities encountered by the wheel and axle support;
   an assembly of stabilizing units independent of the cushioned support for stabilizing the recreational vehicle in a parked condition, each stabilizing unit provided on one of the wheel and axle support and carrier body, said stabilizing unit extendable and retractable between positions of engagement and disengagement with the other of the wheel and axle support and the carrier body, and in the position of disengagement avoids interference with the action of the suspension system, said stabilizing unit in the engagement position providing direct support of the carrier body by the wheel and axle support, said assembly of stabilizing units positioned to cooperatively provide direct support of the entire carrier body and thereby non-cushion support of the entire carrier body.

2. A recreational vehicle as defined in claim 1 wherein for each stabilizing unit an engagement pad is provided on the other of the wheel and axle support and the carrier body in alignment with the extended stabilizing unit and configured to receive direct contact of the stabilizing unit.

3. A recreational vehicle as defined in claim 2 wherein the recreational vehicle is a motor home and the wheel and axle support includes a beam, said pad provided on said beam and the stabilizing unit mounted to the carrier body.

4. A recreational vehicle as defined in claim 3 wherein the carrier body includes a main body frame, said stabilizing unit mounted to the main body frame.

5. A recreational vehicle as defined in claim 4 wherein each stabilizing unit comprises a cylinder and piston and a power source for moving the piston of each unit into and out of the cylinder whereby the piston is moved between positions of engagement and disengagement with the pad of the wheel and axle support.

6. A recreational vehicle as defined in claim 5 wherein the power source is a hydraulic actuator and including a control for controlling the hydraulic actuator and thereby extending and retracting the piston out of and into the cylinder.

7. A recreational vehicle as defined in claim 1 wherein the wheel and axle support includes at least one front pair and one rear pair of wheels, at least one stabilizing unit for the front pair and at least two spaced apart stabilizing units for the rear wheels, said control selectively controlling the extension and retraction of the stabilizing unit for also leveling of the carrier body.

8. A method of stabilizing a recreational vehicle in a parked condition, said vehicle including front and rear pairs of wheels and said method comprising:

providing the recreational vehicle with a carrier body, a wheel and axle support, a suspension system between the carrier body and the wheel and axle support and independent of the suspension system and a plurality of stabilizing units cooperatively and selectively extendable between said carrier body and wheel and axle support; and stabilizing said carrier in a parked condition by selectively and cooperatively extending the stabilizing units for direct and rigid support of the entire carrier body on the wheel and axle support and destabilizing said carrier for driving condition by retracting said stabilizing units and returning support of the carrier body to the suspension system.

\* \* \* \* \*